United States Patent [19]

Serewicz

[11] 3,716,092
[45] Feb. 13, 1973

[54] PANEL INSERT AND METHOD OF INSTALLATION

[75] Inventor: Aubrey J. Serewicz, De Kalb, Ill.

[73] Assignee: Illinois Tool Works Inc., Chicago, Ill.

[22] Filed: April 14, 1970

[21] Appl. No.: 28,475

[52] U.S. Cl. ................................151/41.75, 52/617
[51] Int. Cl. .............................................F16b 37/04
[58] Field of Search ..........151/41.7, 14.5; 85/63, 70, 85/67, 82; 52/617; 264/263

[56] References Cited

UNITED STATES PATENTS

| | | | |
|---|---|---|---|
| 1,628,253 | 5/1927 | Lyddane | 85/67 |
| 1,653,359 | 12/1927 | Goewey | 85/70 |
| 1,999,785 | 4/1935 | Rohde | 151/41.7 |
| 2,718,485 | 9/1955 | Samuely | 151/41.7 |
| 3,082,578 | 3/1963 | Lindstaedt et al. | 85/63 |
| 3,417,653 | 12/1968 | Staads et al. | 85/63 |
| 3,485,282 | 12/1969 | Lopez et al. | 151/41.7 |
| 3,305,996 | 2/1967 | Shapiro | 52/617 |

FOREIGN PATENTS OR APPLICATIONS

| | | | |
|---|---|---|---|
| 137,527 | 10/1952 | Sweden | 85/70 |
| 477,061 | 12/1937 | Great Britain | 85/70 |
| 701,599 | 1/1965 | Canada | 151/14.5 |

Primary Examiner—Edward C. Allen
Attorney—Olson, Trexler, Wolters and Bushnell, Robert W. Beart, Michael Kovac, Barry L. Clark and Jack R. Halvorsen

[57] ABSTRACT

The present invention relates generally to inserts for panels and methods of assembling inserts with panels, and more particularly to insert structures for installation in relatively lightweight panels comprised of a honeycomb core and skin sheets secured to the opposite edges thereof, and to improved methods of assembling insert structures with such panels. The embodiment of the invention disclosed herein comprises an insert assembly having an internally threaded section extending from a base section adapted to be positioned adjacent the inner surface of the panel skin. Said insert assembly also includes an annular thermoplastic section adjacently surrounding the periphery of the threaded section. An annular collar, such as a sheet metal collar, adjacently superimposes the outer extremity of the annular section. Heat from or through said collar causes the annular section to melt and flow into a pre-formed aperture in the panel.

7 Claims, 7 Drawing Figures

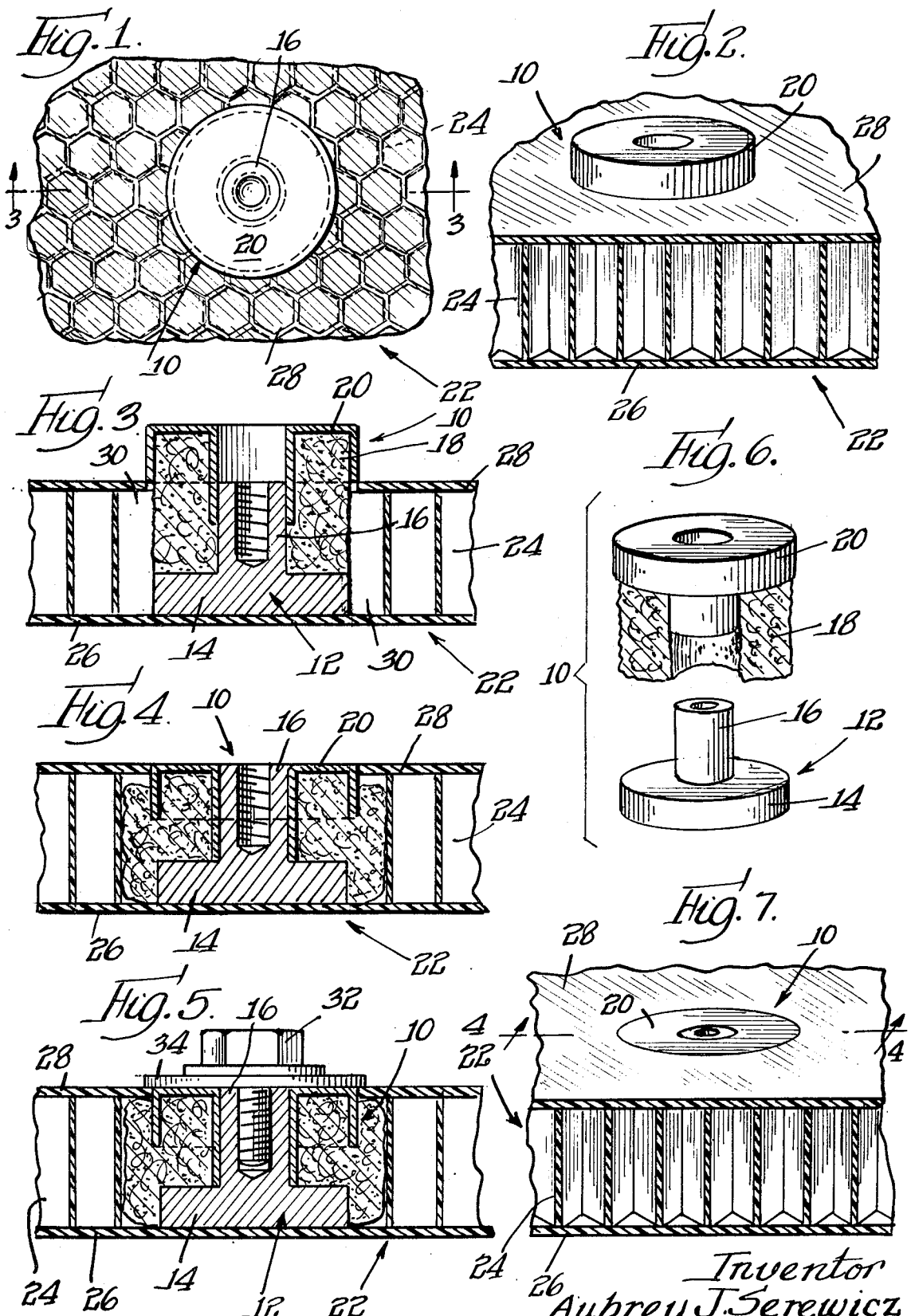

PANEL INSERT AND METHOD OF INSTALLATION

SUMMARY OF THE INTENTION

In instances where the weight of a panel structure is significant, as for example, in panels used on the interior of aircraft and the like, it has been common practice to employ panels of the honeycomb variety. Such panels include a honeycomb core and skin sheets secured to the opposite sides of said core. Panels of this type while light in weight, exhibit considerable lateral strength. Obviously, conventional type fasteners such as screw members and the like, cannot satisfactorily be accommodated by honeycomb type panels without the use of an auxiliary screw accommodating device or insert imbedded within the panel. The present invention is concerned primarily with an improved practical screw accommodating panel insert device which is particularly adaptable for use with the above-mentioned lightweight, honeycomb panel structures.

More specifically, the present invention contemplates the provision of an extremely simple and novel insert structure or assembly which may be bonded to the honeycomb panel structure.

It is a further object of the present invention to provide a screw accommodating insert device of the type referred to above which may be secured in place by the application of heat thereto after an initial insertion within a pre-formed panel opening.

It is not only an object of the present invention to provide the novel and improved insert device referred to above, but also to provide a novel and practical method whereby such insert devices may be permanently attached to a honeycomb type panel structure.

BRIEF DESCRIPTION OF THE DRAWINGS

The foregoing and other objects and advantages will be more apparent from the following detailed description when considered in connection with the accompanying drawing wherein:

FIG. 1 is a plan view of the insert assembly contemplated by the present invention disclosed in its initial position of insertion within a honeycomb type panel, said panel being disclosed fragmentarily;

FIG. 2 is a perspective view of the structure shown in FIG. 1 as viewed from the front of the panel;

FIG. 3 is a fragmentary enlarged sectional view taken substantially along the line 3—3 of FIG. 1, said view showing the position of the insert assembly prior to the application of heat to the outwardly projecting collar;

FIG. 4 is a sectional view similar to FIG. 3, disclosing the final assembly of the insert device after heat has been transferred to the annular section of thermoplastic adhesive;

FIG. 5 is a view similar to FIG. 4, showing the manner in which a screw member may be received by the internally threaded insert member for securing a member to the panel;

FIG. 6 is a perspective view disclosing the internally threaded insert member axially separated from the complementary collar and annular section of flowable material associated therewith; and FIG. 7 is a perspective view similar to FIG. 2 disclosing the neat, flush appearance of the exposed extremity of the insert assembly after it has been finally secured to the honeycomb panel.

DESCRIPTION OF THE PREFERRED EMBODIMENTS

Referring now to the drawing wherein like numerals have been employed to designate similar parts throughout the various figures, it will be seen that the present invention contemplates an insert assembly designated generally by the numeral 10. This assembly 10 includes an insert member 12 having a base section 14, and an internally threaded section or neck 16 extending axially from and formed integral with one side of the base 14. The insert assembly 10 also includes an annular section 18, preferably formed of suitable material having the functional characteristics of a thermoplastic adhesive or mastic. Thus the material of the annular section 18 is solid in its unheated stage, and when subjected to heat will flow readily.

An annular collar 20 adjacently superimposes the upper inner and outer periphery of the annular member 18, as well as the end surface thereof. For reasons hereinafter set forth, the inner wall of the sheet metal member 20 is preferably of greater axial extent than the outer wall as clearly shown in FIGS. 3 and 4. Thus the inner peripheral surface of the collar 20 at the time of initial telescopic assembly thereof with the insert member 12 adjacently embraces the outer periphery of the insert neck 16. In this manner the insert 12, the annular member 18 and the collar 20 present an insert assembly. The collar 20 is preferably formed from sheet metal which will readily conduct heat applied thereto. Also the insert 12 may consist of suitable plastic material which is a poor conductor of heat such as Delrin, or other material having similar characteristics.

A panel for accommodating the above described insert assembly 10, is designated generally by the numeral 22. The panel 22 comprises a core 24 of honeycomb material secured between an inner fiberglass decorative skin or sheet 26 on one side and a similar skin or sheet 28 adhered to the other side. Before installing the insert assembly 10 the outer skin 28 and the honeycomb core 24 are apertured and routed as shown in FIG. 3. This aperture in the honeycomb core 24 is designated by the numeral 30. Upon insertion of the assembly 10 within the aperture 30, the end surface of the base section 14 of the insert 12 rests against the inner surface of skin 26. Pull-out strength may be added to the assembly by coating the base of insert 12 with adhesive to adher to the inner surface of skin 26. Also the upper extremity of the thermoplastic annular member 18, and the upper portion of the collar 20 associated therewith, project beyond the skin 28. The application of heat to the sheet metal collar 20, as for example, by induction, will cause the thermoplastic annular collar 18 to melt and flow into the pre-formed aperture 30 in the honeycomb core 24. The collar may alternatively, be formed of a non-conductive material. In cooperation with a non-conductive collar, the annular thermoplastic collar 18 is formed of metal filled or metal oxide filled thermoset adhesives. In this system, the collar is unaffected by the transfer of energy. A further alternative system would include the application of ultrasonic energy to the sheet metal collar to provide heat to the thermoplastic material. The collar 20 will ultimately assume the position shown in FIG. 4, with the outer surface thereof positioned flush with the outer surfaces of the sheet 28 and the insert neck 16. The engagement of the entering edge of the inner wall of the collar 20 with the insert base section 14 as shown in FIG. 4, assures the proper positioning of the outer surface of the collar 20 with respect to the outer surface of the skin 28.

It will be clear from the foregoing description that the overall axial extent of the insert member 12 is equal to, or at least not substantially greater than the thickness of the panel 22. The flush neat appearance of the completely installed insert assembly is shown clearly in FIG. 7. It should also be understood that the thermoplastic adhesive of the annular member 18 upon being heated will become viscous and upon filling the pre-formed opening 30, will become bonded to the honeycomb core and inner surface of skin 26. Upon cooling, the member 18 will solidify. A nitrile-phenolic mix is representative of the type of thermoplastic adhesive which may be employed in the fabrication of the annular member 18.

With the above described insert assembly 10 securely bonded within the honeycomb core 24, a screw member 32 may be applied to the internally threaded neck section 16 and clamped against a part 34. The part 34 merely representative of many objects which may be secured firmly to the panel after the assembly 10 has been installed in the above described manner.

While the base of insert 12 is shown as being substantially annular, it could be configured with serrations or apertures to restrict rotation thereof.

From the foregoing it will be apparent that the present invention contemplates a very simple procedure for permanently securing an internally threaded insert member, the annular thermoplastic section, and the annular collar element, present an insert assembly which may be handled as a self-contained unit. Thus the ease and convenience with which a screw accommodating insert may be secured firmly within a honeycomb panel is greatly facilitated. By engaging the outwardly projecting portion of the thermoplastic annular section with a sheet metal annulus of the type described, and then subjecting the annulus to heat so as to cause the thermoplastic annular section to become viscous, the flush positioning of the outer disc-like wall of the sheet metal annulus with respect to the previously perforated skin sheet is assured. While many of the commercially available honeycomb panel structures are formed of heat resistant resinous materials, others are composed of lightweight sheet metal such as aluminum. It should be understood that the present invention may also be used with equal facility in association with honeycomb panel stock composed of lightweight sheet metal. By employing a suitable thermoplastic adhesive for the section 18, it is possible to obtain a very firm, strong and permanent bond between the internally threaded insert member and the honeycomb core.

I claim:

1. An insert assembly for installation in a lightweight panel such as a panel including a honeycomb core and skin sheets secured to the opposed sides thereof and having an insert assembly accommodating aperture extending through one of said skin sheets and continuing through the core to the opposite skin sheet, said insert assembly including an insert member having a base section, said base section having a first substantially flat surface for seating engagement with said skin sheet and a second substantially flat surface facing in a direction opposite to said first surface, and a threaded section of reduced width extending axially from said second, substantially flat surface the exterior surface of said threaded section being disposed perpendicular to said second surface, said insert assembly also including a member surrounding at least a portion of the periphery of said threaded section, said member being formed of a thermoplastic material that will become viscous and flow when heated and will solidify when cooled, means for applying heat to said member and for controlling flow of said thermoplastic material when in the viscous state, said means including a heat conductive collar superimposing a portion of said thermoplastic member, said heat conductive collar comprising, an apertured end wall portion overlying an end of said thermoplastic member and having inner and outer marginal edges, an inner wall portion extending axially from the inner marginal edge of said end wall and surrounding said threaded section and disposed intermediate said threaded section and said thermoplastic member, and an outer wall portion overlying a segment of the external periphery of said member and extend axially from said end wall portion from a location proximate the outer marginal edge thereof, said inner wall portion having a length greater than that of said outer wall portion; and said thermoplastic member, in the unassembled condition, having an axial extent such that upon seating of said base section on a skin sheet, said end wall section will be disposed exteriorly of said panel, while said inner wall portion is spaced axially from said second, substantially flat surface of said base section, and the end of said exterior wall portion will be disposed at a location that would place it at or below the upper surface of the apertured skin sheet in which the insert is to be disposed; such that upon the application of heat to said collar, said thermoplastic member will become viscous permitting said collar to move inwardly until said inner wall portion engages said second substantially flat surface which engagement precludes further inward movement of said collar, and assures that the end of said outer wall portion is spaced from said second substantially flat surface, the initial positioning of said outer wall portion assuring that said viscous material does not flow exteriorly of the panel while the final position of said outer wall portion assures that said viscous material will flow outwardly of said insert assembly whereby upon cooling and solidification of said thermoplastic material, an assembled relation between said insert assembly and a panel may be attained.

2. An insert assembly as defined in claim 1, wherein said threaded section comprises an internally threaded portion, and said collar, in the unassembled condition, projects axially beyond the extremity of the threaded section.

3. An insert assembly as defined in claim 1, wherein said collar is in the form of a sheet metal annulus.

4. An insert assembly as defined in claim 1, wherein said inner wall portion is annular, and continuous about the entire extent of said inner marginal edge of the end wall portion.

5. An insert assembly as defined in claim 1, wherein said outer wall portion, said inner wall portion, said thermoplastic member and the inner and outer marginal edges of said end wall are of an annular configuration.

6. An insert assembly as defined in claim 1, wherein said thermoplastic member is formed of a thermoplastic adhesive.

7. An insert assembly as defined in claim 6, wherein said thermoplastic adhesive is nitrile-phenolic mix.

* * * * *